United States Patent
Borate et al.

(10) Patent No.: US 11,138,247 B2
(45) Date of Patent: Oct. 5, 2021

(54) SYSTEMS AND METHODS FOR A FULL TEXT SEARCH ENGINE IMPLEMENTED USING OBJECT STORAGE TECHNIQUES

(71) Applicant: Druva, Inc., Sunnyvale, CA (US)

(72) Inventors: Milind Borate, Pune (IN); Yogendra Acharya, Pune (IN); Anand Apte, Pune (IN)

(73) Assignee: Druva, Inc., Sunnyvale, CA (US)

(*) Notice: Subject to any disclaimer, the term of this patent is extended or adjusted under 35 U.S.C. 154(b) by 237 days.

(21) Appl. No.: 15/945,574

(22) Filed: Apr. 4, 2018

(65) Prior Publication Data
US 2018/0293301 A1 Oct. 11, 2018

(30) Foreign Application Priority Data
Apr. 7, 2017 (IN) .............................. 201711012654

(51) Int. Cl.
*G06F 16/33* (2019.01)
*G06F 21/60* (2013.01)
*G06F 16/27* (2019.01)
*G06F 16/31* (2019.01)
*G06F 16/951* (2019.01)

(52) U.S. Cl.
CPC ............ *G06F 16/334* (2019.01); *G06F 16/27* (2019.01); *G06F 16/316* (2019.01); *G06F 16/319* (2019.01); *G06F 16/951* (2019.01); *G06F 21/602* (2013.01)

(58) Field of Classification Search
CPC ...... G06F 16/334; G06F 16/27; G06F 16/316; G06F 16/951; G06F 16/319; G06F 21/602
See application file for complete search history.

(56) References Cited

U.S. PATENT DOCUMENTS

| | | | |
|---|---|---|---|
| 6,278,992 B1* | 8/2001 | Curtis | G06F 16/2237 707/711 |
| 6,349,308 B1* | 2/2002 | Whang | G06F 16/2246 |
| 8,793,466 B2* | 7/2014 | Shao | G06F 3/0626 711/201 |
| 2005/0108189 A1* | 5/2005 | Samsonov | G06F 16/951 |
| 2010/0161569 A1* | 6/2010 | Schreter | G06F 16/2272 707/696 |
| 2011/0004607 A1* | 1/2011 | Lokam | G06F 21/6227 707/759 |

(Continued)

OTHER PUBLICATIONS

Mike Deck, "Building and Maintaining an Amazon S3 Metadata Index without Servers", Aug. 12, 2015, available from <https://aws.amazon.com/blogs/big-data/building-and-maintaining-an-amazon-s3-metadata-index-without-servers/> (Year: 2015).*

(Continued)

*Primary Examiner* — Matthew Ell
*Assistant Examiner* — Anugeetha Kunjithapatham
(74) *Attorney, Agent, or Firm* — Fenwick & West LLP

(57) ABSTRACT

Aspects of the current patent document include systems and methods to perform search in an index system. In one embodiment, an index system may be implemented in an object storage. A distributed database index is used in conjunction with the object storage. In some cases, data stored in the distributed database may be encrypted and moved to object storage. The object storage stores a plurality of blocks containing words. Each block can contain a large number of words, such as one million words.

21 Claims, 10 Drawing Sheets

(56) References Cited

U.S. PATENT DOCUMENTS

| | | | |
|---|---|---|---|
| 2012/0089569 A1 | 4/2012 | Mason, Jr. et al. | |
| 2013/0275480 A1* | 10/2013 | Dhuse | G06F 16/2272 707/829 |
| 2016/0132524 A1 | 5/2016 | Rao et al. | |
| 2017/0277590 A1* | 9/2017 | Luse | G06F 3/0619 |

OTHER PUBLICATIONS

"Druva Announces First-Ever Endpoint Data Protection to Address Federal Standards for Public Cloud",Dec. 15, 2015, <https://web.archive.org/web/20160402073914/https://www.druva.com/about/press-releases/druva-announces-first-ever-endpoint-data-protection-to-address-federal-standards-for-public-cloud/> (Year: 2016).*

"Protecting Data Using Server-Side Encryption with Customer-Provided Encryption Keys (SSE-C)", Dec. 2, 2016, available from < https://web.archive.org/web/20161202043642/https://docs.aws.amazon.com/AmazonS3/latest/dev/ServerSideEncryptionCustomerKeys.html> (Year: 2016).*

Jaspreet Singh, "Encryption, Deduplication and Making Sense", Mar. 11, 2012, available from <https://www.druva.com/blog/encryption-deduplication-making-sense/> (Year: 2012).*

Katherine Cho, "Dive Deeper Into Your Data with Full Text Search Indexing", Feb. 9, 2016, available from <https://www.druva.com/blog/dive-deeper-into-your-data-with-full-text-search-indexing/> (Year: 2016).*

Vogels: Werner Vogels, "Amazon DynamoDB—a Fast and Scalable NoSQL Database Service Designed for Internet Scale Applications", Jan. 18, 2012, accessible from <https://www.allthingsdistributed.com/2012/01/amazon-dynamodb.html> (Year: 2012).*

United States Office Action, U.S. Appl. No. 16/171,010, dated Jul. 21, 2021, six pages.

* cited by examiner

SYSTEMS AND METHODS FOR A FULL TEXT SEARCH ENGINE IMPLEMENTED USING OBJECT STORAGE TECHNIQUES

CROSS-REFERENCE TO RELATED APPLICATION

This patent application claims the priority benefit of co-pending and commonly-owned Indian Provisional Application 201711012654, filed on Apr. 7, 2017, entitled "SYSTEMS AND METHODS FOR A FULL TEXT SEARCH ENGINE," and listing Milind Borate, Yogendra Acharya, and Anand Apte as inventors (Docket No. 20133-2083IN), which patent document is incorporated by reference herein in its entirety and for all purposes.

BACKGROUND

A. Technical Field

The present invention relates generally to data storage and searching, and relates more particularly to a full text search engine.

B. Description of the Related Art

As the value and use of information continues to increase, individuals and businesses seek additional ways to process and store and search information. One option available to users is information handling systems. An information handling system generally processes, compiles, stores, searches and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems also need a mechanism to index and search the information stored. Storing information in a way that it can be indexed and searched easily and quickly is expensive. Prior art indexing systems use hard disk drives to store information and create an index that can be searched responsive to a search query. FIG. 1 depicts a high-level block diagram of an indexing system. FIG. 1 shows indexing system 100 including a list of words with their corresponding document identification (doc id) 105 and index 110. As new words are added to the index 110, as shown in step 115, the words have the ability to be searched 120. A document identifier 125 can be output responsive to a search query.

One shortcoming of the prior art indexing scheme is that it is difficult to scale. As the index grows, more hard disk drive space is needed. Hard disk drives typically have to be connected to a machine or a computer. The hard disk drive and the machine must remain powered on in order for the index to updated or searched. It can be expensive to run the hard disk drives and the machines connected to them at all times. Further, as the index grows, more disk drive space is needed and typically more than one disk drive and more than one machine is used.

Accordingly, what is needed are systems and methods that improve storage and indexing of full text search engines and provide additional scalability.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1:
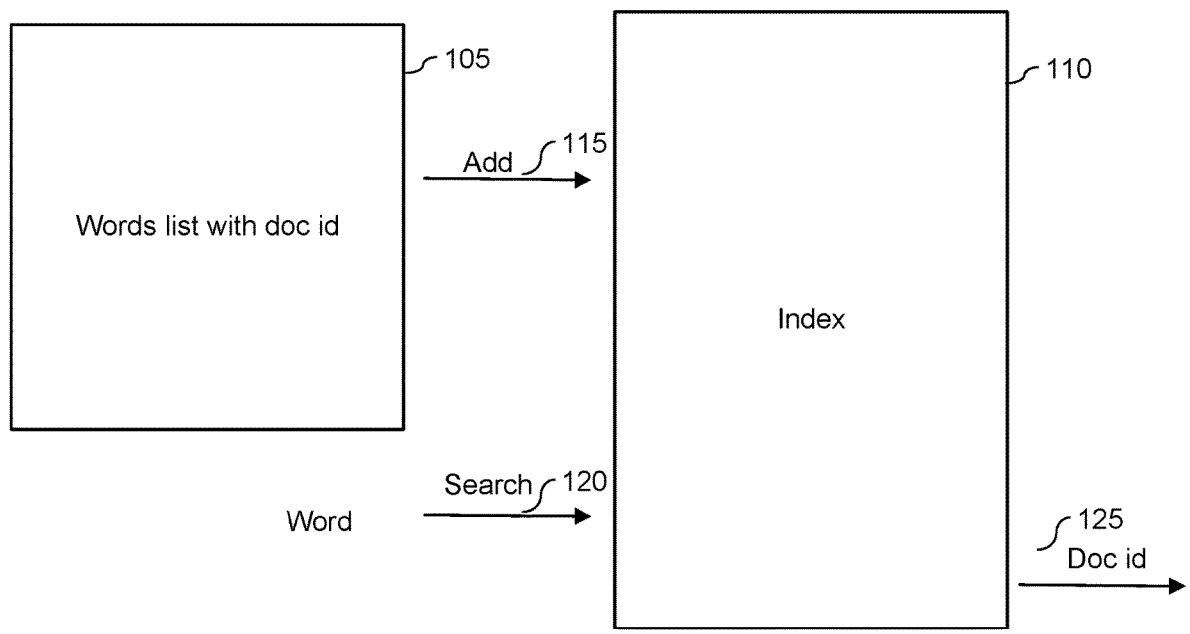
FIG. 1 depicts a high-level block diagram of an indexing system according to embodiments in this patent document.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system/device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "link," "linked," "coupled," "connected," "communicatively coupled," or their variants shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. Furthermore, the use of memory, database, information base, data store, tables, hardware, and the like may be used herein to refer to system component or components into which information may be entered or otherwise recorded.

The terms "include," "including," "comprise," and "comprising" shall be understood to be open terms and any lists that follow are examples and not meant to be limited to the listed items. Any headings used herein are for organizational purposes only and shall not be used to limit the scope of the description or the claims.

Furthermore, it shall be noted that: (1) certain steps may optionally be performed; (2) steps may not be limited to the specific order set forth herein; (3) certain steps may be performed in different orders; and (4) certain steps may be done concurrently.

The present invention relates in various embodiments to devices, systems, methods, and instructions stored on one or more non-transitory computer-readable media involving full text search indexing. Such devices, systems, methods, and instructions stored on one or more non-transitory computer-readable media can result in, among other advantages, full text search indexing.

In a full text search index system, a buffer can be used to store words along with identification. The words can be terms, documents, files, names or any other item capable of being stored and searched. For the purpose of this document, the above terms are used interchangeably.

In an indexing system words and an identification path can be stored in an index that can be searched. As described above, one disadvantage of the prior art indexing systems is that the indexes cannot scale easily and require adding more hard disk drives and more computers along with the hard disk drives. Embodiments described herein overcome those limitations by using object storage.

Figure 2:
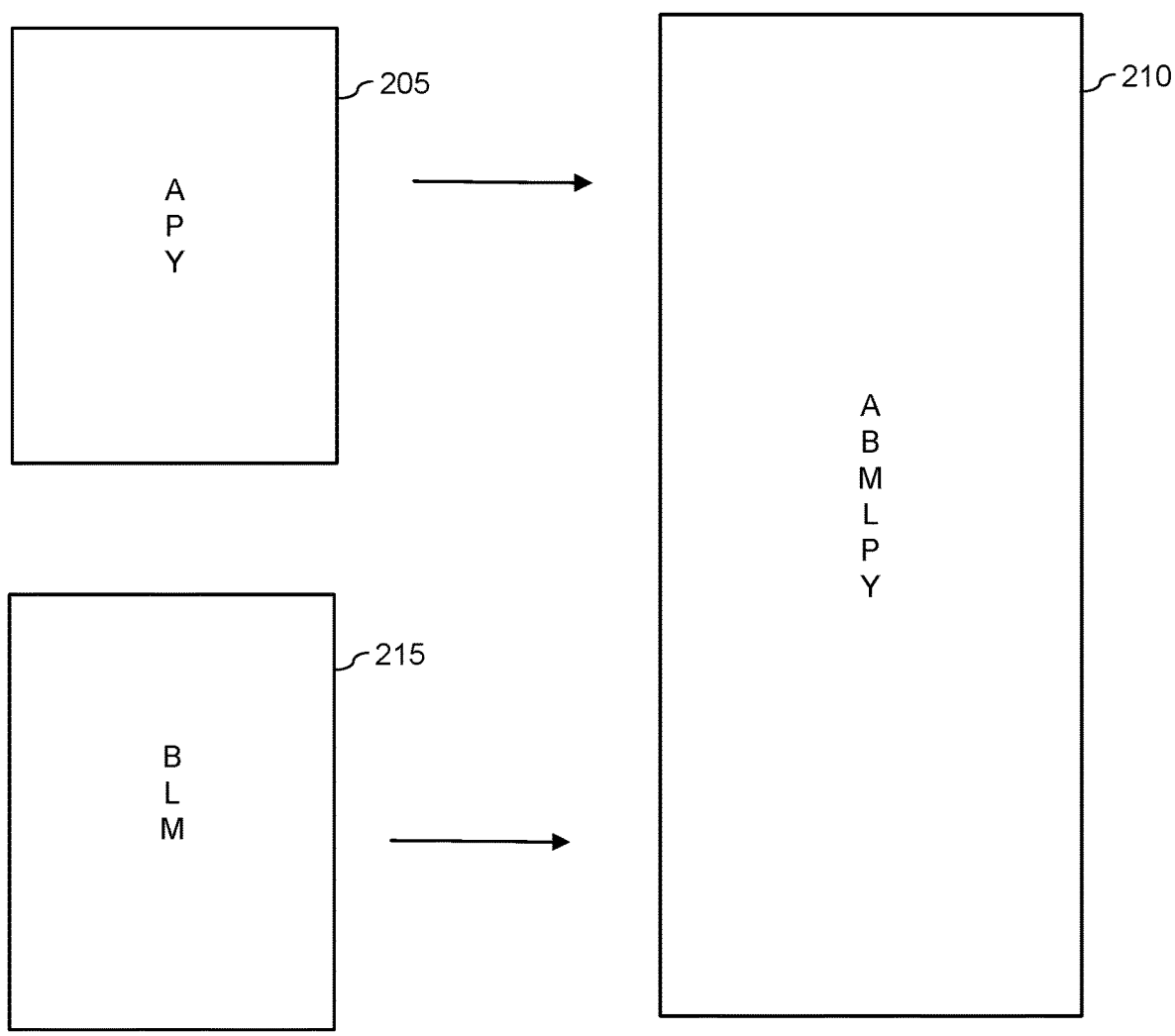
FIG. 2 depicts a block diagram of a merge operation in an indexing system according to embodiments of the present disclosure.

FIG. 2 depicts a block diagram of a merge operation 200 in an indexing system according to embodiments of the present disclosure. FIG. 2 shows two buffer indexes 205 and 215, both already in sorted order. In the embodiment shown in FIG. 2 the two indexes are merged into one index 210. Index 210 also is sorted. For example, in FIG. 2, index 205 contains A, P, and Y and document identification. Index 215 contains B, L, and M and document identification. When the two indexes are merged into index 210, containing A, B, M, L, P, and Y and document identification. The contents are in sorted order when merged in index 210.

In the system shown in FIG. 2, buffers can be used to build indexes. For example, a buffer can be used to store A, P, and Y. Once the buffer is full it can be saved to a hard disk and a new buffer started. In the example shown in FIG. 2, the new buffer contains B, L, and M. Once that buffer is full, it can also be saved to a hard disk. The two indexes can be merged as shown in FIG. 2 on the hard disk.

Figure 3:
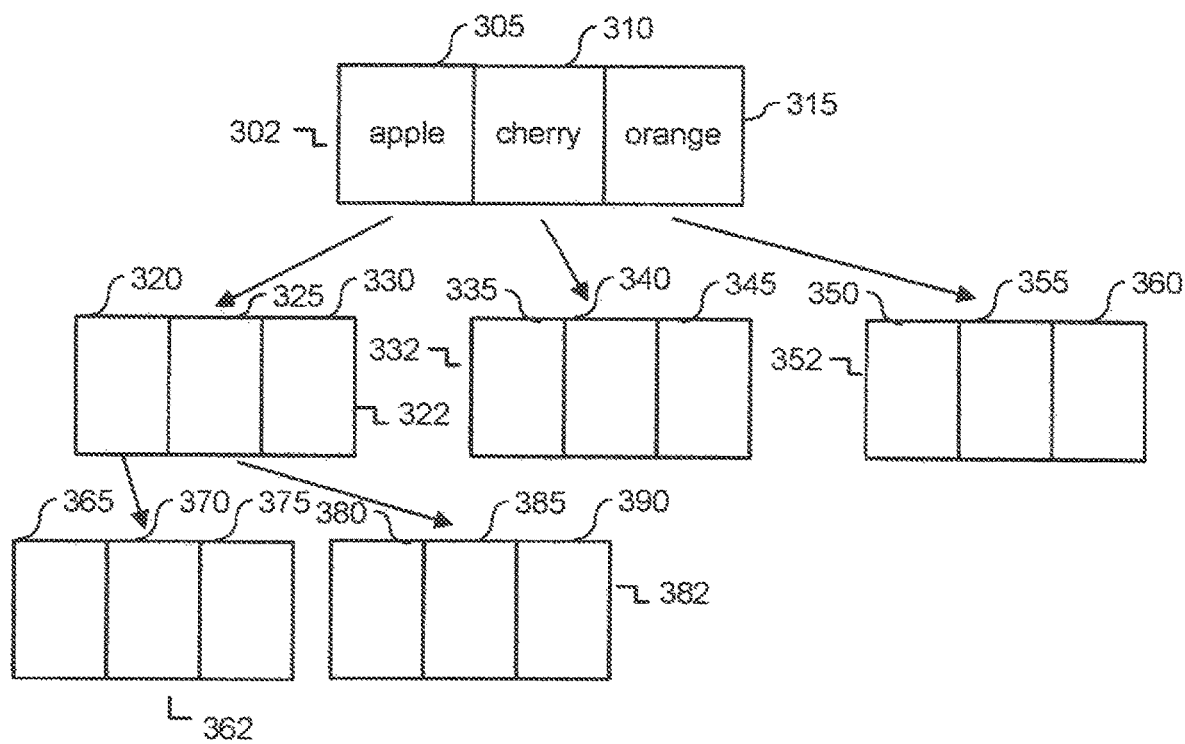
FIG. 3 depicts a block diagram of a B+ tree structure indexing system according to embodiments of the present disclosure.

FIG. 3 depicts a block diagram 300 of a B+ tree structure indexing system according to embodiments of the present disclosure. FIG. 3 shows another representation of an indexing system in a B+ tree structure. The B+ tree structure includes a plurality of nodes. Node 302 is a root node in the tree structure. The root node indicates a lookup, similar to a dictionary, where words can be found in the tree. For example, in the embodiment shown in FIG. 3, root node contains an indication that words less than apple 305 can be found in internal node 322, words between apple and cherry can be found in internal node 332, words between cherry and orange can be found in internal node 352. The tree structure can continue with leaf nodes 362 and 382. The example shown in FIG. 3 is merely exemplary and not intended to limit the embodiments to any particular number of nodes or number of layers on the tree.

As the tree grows more and more indexes can be built and more machines and hard disk drives can be used. However, this tree structure has the drawbacks of expensive scalability due to the use of hard disk drives requiring machines to remain on so the search can be performed.

Figure 4:
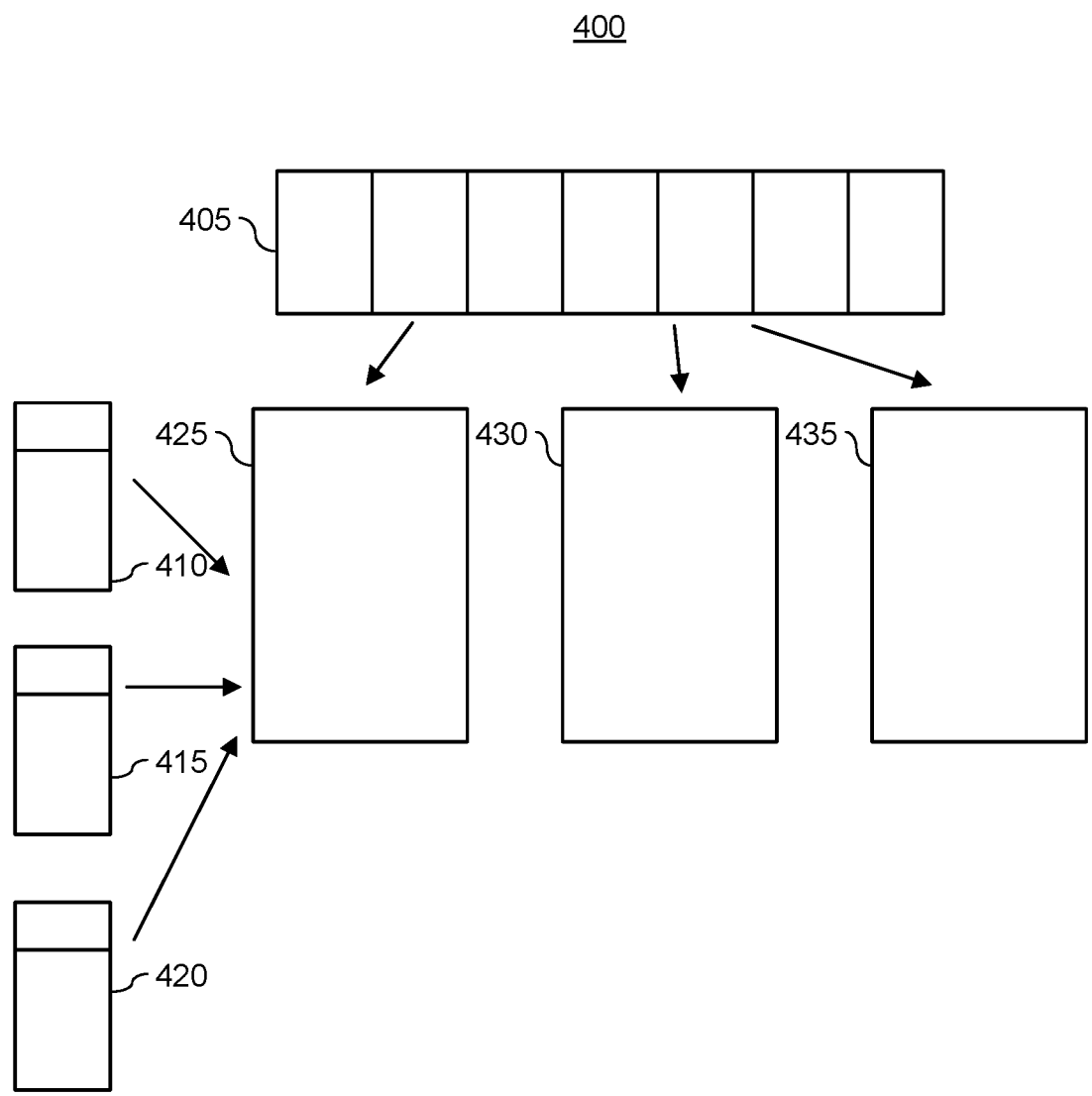
FIG. 4 depicts a block diagram of an indexing system according to embodiments of the present invention.

FIG. 4 depicts a block diagram of an indexing system 400 according to embodiments of the present invention. FIG. 400 shows indexes 410, 415, and 420 merged into index 425. Further, other indexes can be merged into indexes 430 and 435. As the index grows each index can be started on a new machine 425, 430, and 435 can all be stored on different hard disk drives on different machines. Since the index can grow large enough to be stored on a plurality of machines, all machines need to be searched in order to search the index. Therefore, the embodiment shown in FIG. 4 also shows a map 405 to map the various indexes 425, 430, and 435. It shall be understood that the number of indexes and mappings is not limited to the numbers shown in FIG. 4.

Figure 5:
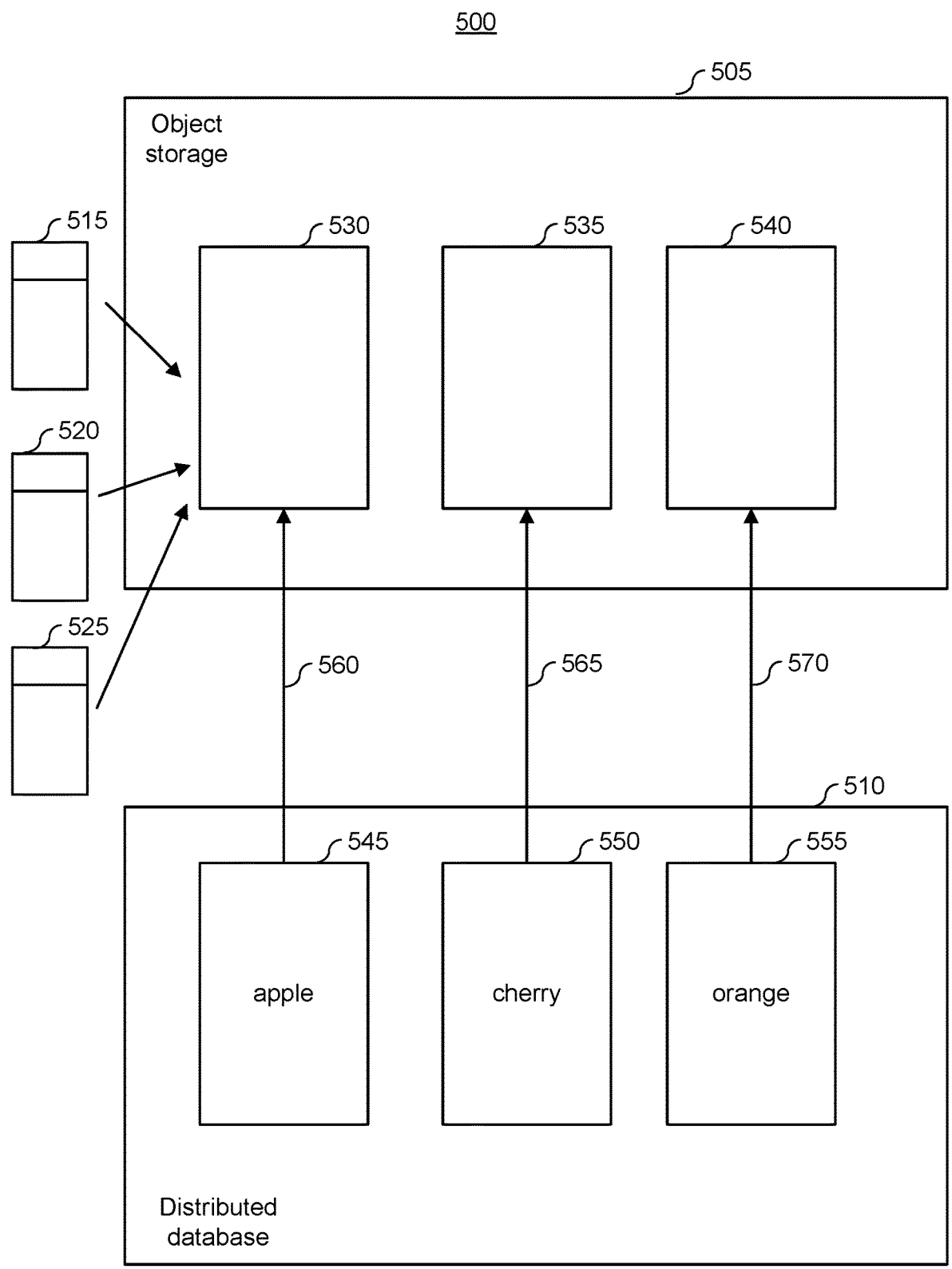
FIG. 5 depicts a block diagram of an indexing system using object storage and a distributed database according to embodiments of the present invention.

FIG. 5 depicts a block diagram of an indexing system 500 using object storage and a distributed database according to embodiments of the present invention. In the embodiments shown in FIG. 5, object storage is implemented to store data merged from the indexes described in reference to FIGS. 2-4. Object storage is a computer storage architecture that stores data as objects. Indexes can be stored as objects 530, 535, and 540 as shown in FIG. 5. In embodiments, objects can be stored in object storage. Objects can also have object keys. In embodiments, an object key is a name assigned to an object used to retrieve the object.

Indexes 515, 520, and 525 can be merged into index 530. It shall be understood that the embodiments described are not limited to a particular number of indexes or objects. In embodiments, objects 515, 520, and 525 can be stored in object storage 505. Object storage provides significant advantages over conventional hard disk drive storage. For example, object storage can be used to build the index and can be large, but does not have to maintained on a hard disk drive with a machine that has to be kept on. Also, the cost of object storage is considerably less than the cost of hard disk drive storage. A cost savings of a factor of 10 can be enjoyed by using object storage over conventional hard disk drive storage.

In embodiments, a distributed database 510 can be used to map to the various objects 530, 535, and 540 stored in object storage 505. Distributed database 510 can be updated as the merge shown merging blocks 515, 520, and 525 to object 530. Pointers can be used from the distributed database 510 to the object storage 505 to indicate what object to perform the search in object storage 505. Pointers are shown on FIG. 5 as 560, 565, and 570.

In one example of the embodiments shown in FIG. 5, one million words can be stored in each object 530. In an example of the embodiments shown in FIG. 5, 1000 objects can be stored in each object storage. Thus, in this example, one billion terms can be stored.

As the size of the index grows, the index does not fit in a single object. In embodiments, the index may be split among multiple objects. In embodiments, a plurality of object keys in the index can be sorted and the first keys can be stored in a first object, the second set in a second object, etc. Thus, an object is split into a plurality of objects.

As more terms are added or more indexes are merged, more storage space can be required. Index that requires more space can be stored in multiple objects so that individual object size does not grow too big. The objects can be ordered such that high order objects store higher order terms. This ordering can be stored using the distributed database 510. In the embodiment shown in FIG. 5, the object order can be stored in the distributed database 510, whereas leaf nodes can be stored in the object storage 505.

The embodiments shown in FIG. 5 take advantage of the fact that object storage is designed to write once and read multiple times. Since object storage is designed to be written to once, the distributed database 510 can serve as the root and internal nodes 545, 550, and 555, including words apple, cherry, and orange, similar to the root nodes shown in FIG. 3. Distributed database 510 can be updated as more objects are added to the object storage.

Figure 6A:
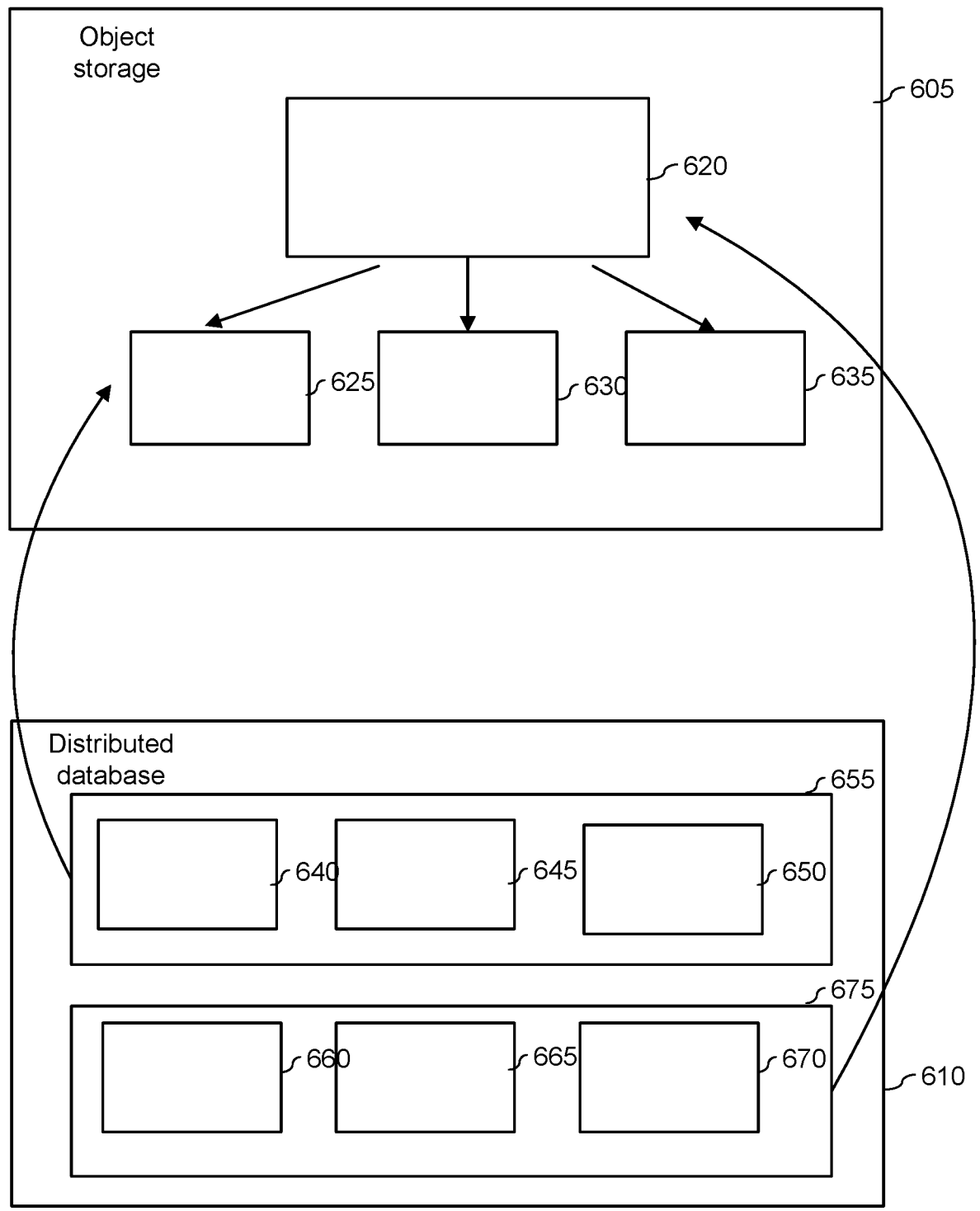
FIG. 6A depicts a block diagram of an indexing system using object storage and a distributed database using encryption according to embodiments of the present invention.

In one embodiment, the order of objects that is stored in distributed database can be moved to an object to avoid accessing the distributed database during search. For searching, the object that stores the order is loaded first to identify the leaf node that contains the term being searched. FIG. 6A depicts a block diagram of an indexing system 600 using object storage and a distributed database using encryption according to embodiments of the present invention. FIG. 6A shows object storage 605 and distributed database 610. In the embodiments shown in FIG. 6A, root nodes 640, 645, and 650 can be combined 655 and encrypted and stored in object storage 605. In one embodiment 50 nodes are combined and encrypted and moved to object storage as 620. In another embodiment, any number of nodes in the distributed database 610 can be combined, encrypted, and stored in object storage 605. In one embodiment, 1000 nodes can be combined and stored in object storage 605. A tree structure can also be built in object storage shown in FIG. 6A as root node 620 and leaf nodes 625, 630, and 635. Any number of nodes can be used in this index and any number of internal nodes can be used in the tree in object storage.

In embodiments, all the objects are encrypted and an initialization vector (IV) for the encryption is a combination of index id and the position of the object in the index. In embodiments, another level of index can be used as shown in FIG. 6A. The level 1 index 625, 630, or 635 can use the last key indexed by level 0 object 620 as the key and the position of the level 0 object 620 as the value.

Figure 6B:
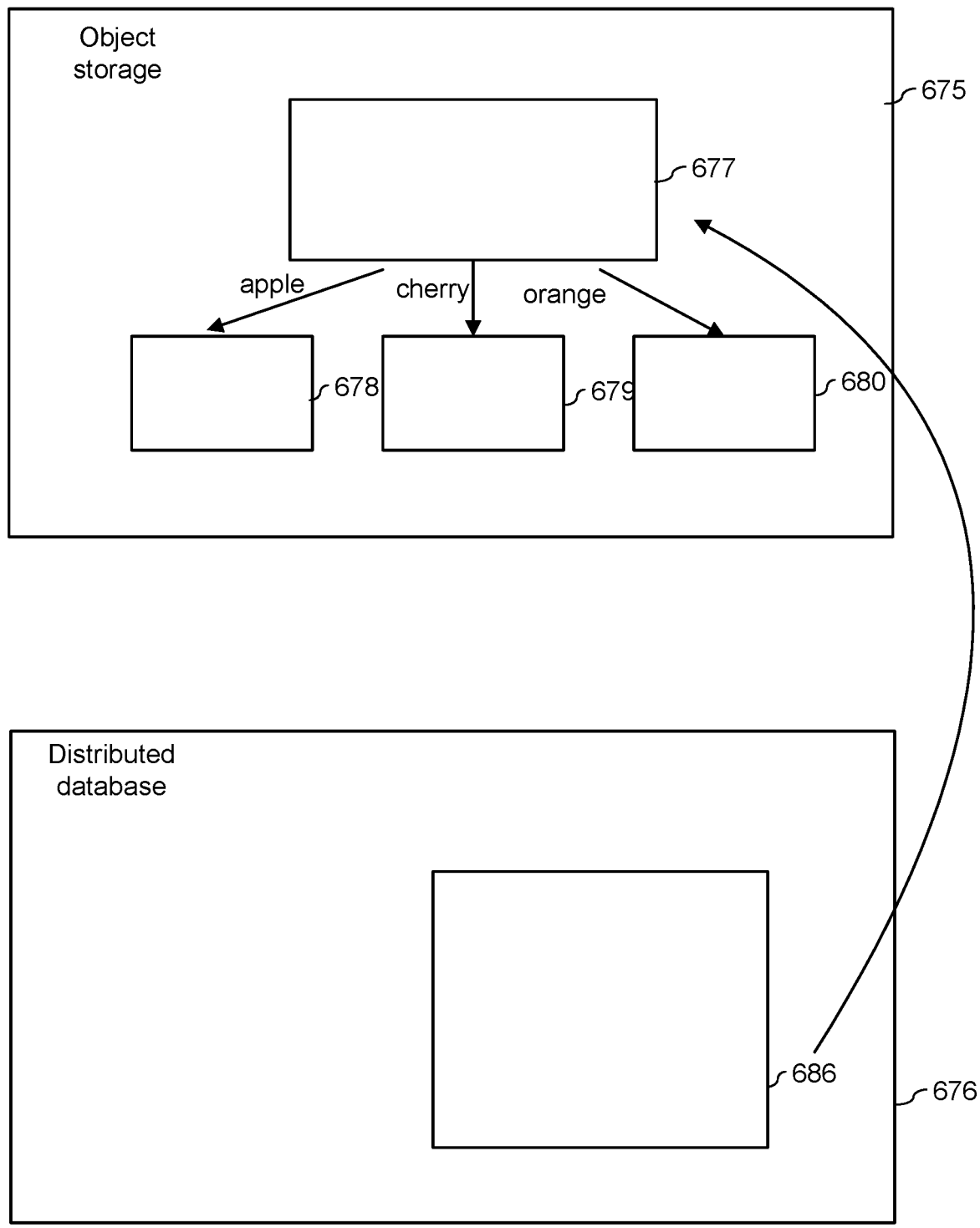
FIG. 6B depicts a block diagram of an indexing system using object storage and a single distributed database entry according to embodiments of the present invention.

FIG. 6B depicts a block diagram of an indexing system using object storage and a distributed database according to embodiments of the present invention. FIG. 6B shows an object storage 675 and a distributed database 676. FIG. 6B shows a block diagram having a level 1 index 677 and a level 0 index 678, 679, and 680.

During search, level 1 index 677 is searched first to locate from the level 0 objects (apple, cherry, orange) 678, 679, 680, the level 0 object that contains the key being searched. Once the level 0 object is identified, it can be loaded and searched for the given key within that object. If the level 1 index grows too big to fit in a single object, it can be split and a level 2 index (not shown) can be built to improve search efficiency and so on.

The higher-level objects can also be encrypted, and the IV is composed of index id, the level and position of object in higher level index.

During the merge process, as level 0 objects are added, entries in a level 1 object can be made and stored (instead of adding distributed database entries to record the order of level 0 objects). There are two challenges with this system. One, objects can only use eventual consistency when it comes to updates to the same object. Two, the same IV cannot be used to encrypt multiple data blocks because that increases the chances of an intruder cracking the encryption key. To overcome the first challenge, every time a higher-level object is stored a different path is used so that it gets treated as a new object write rather than an update.

To overcome the second challenge, a modification counter can be added to the IV. When an object is stored for the first time, the modification counter is 1. When another key is added and the object stored a second time, the modification counter is incremented and so on for the subsequent keys added. The final modification sets the counter to 0. In embodiments, the same modification counter is used to build new object path for each change. In embodiments, the final object is found at a predictable path with a predictable IV because the modification counter is set to 0.

During the index build process, a single distributed database entry 686 to mark the top-level object (at that point in the index build process) can be used, e.g., 686. The database entry 686 can store the level and modification counter for the top-level object.

Figure 7:
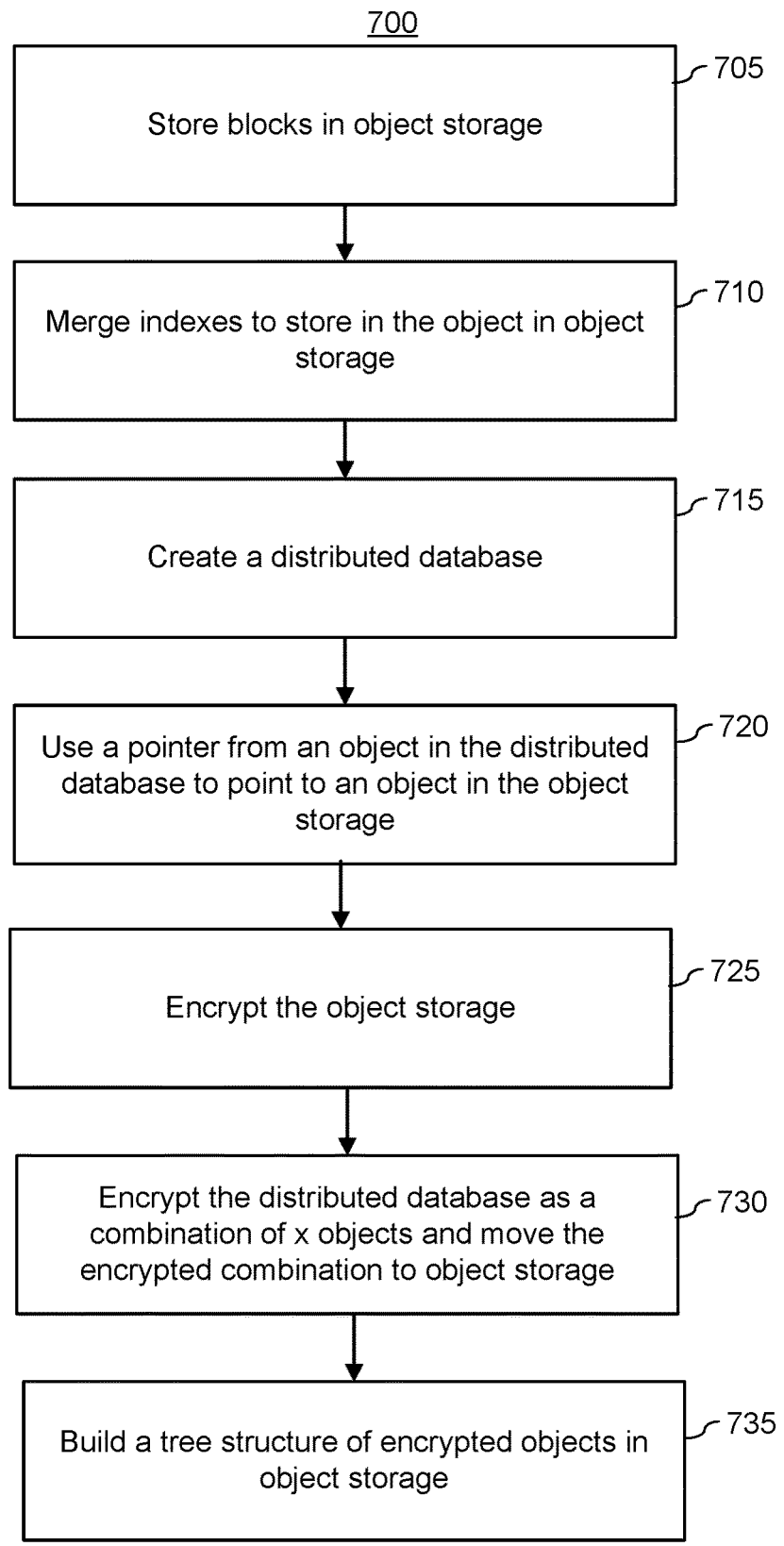
FIG. 7 depicts a flowchart depicting a process of creating an index according to embodiments of the present invention.

FIG. 7 depicts a flowchart depicting a process 700 of creating an index according to embodiments of the present invention. FIG. 7 shows storing blocks in object storage 705. The blocks can be stored as objects with an object key. The blocks can be merged as indexes to store in the object in object storage 710. FIG. 7 also shows creating a distributed database 715. A pointer can be used to map from an object in the distributed database to an object in the object storage 720. In embodiments, encryption can be used to encrypt the object storage 725. In embodiments encryption can also be used to encrypt the distributed database as a combination of x objects and moving the encrypted combination to object storage 730. A tree structure can be built with the objects in object storage 735.

Figure 8:
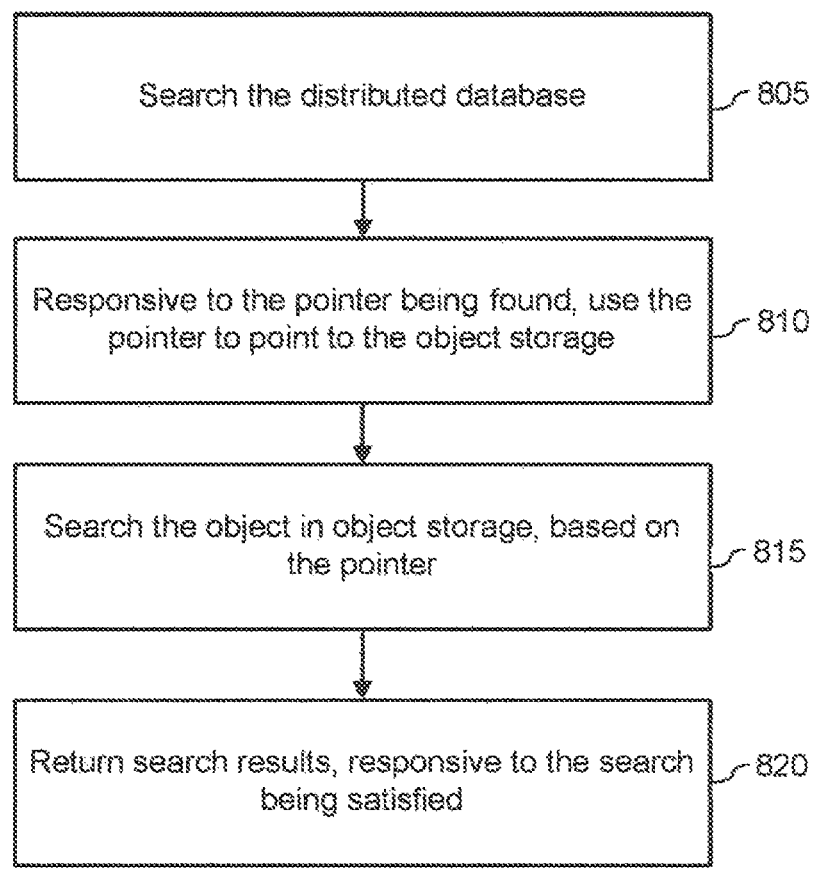
FIG. 8 depicts a flowchart depicting a process of searching an index according to embodiments of the present invention.

FIG. 8 depicts a flowchart depicting a process 800 of searching an index according to embodiments of the present invention. FIG. 8 shows searching the distributed database 605 as described above with reference to FIG. 6A. FIG. 8 also shows responsive to the pointer being found, using the pointer to point to the object storage 810. FIG. 8 also shows searching the object in object storage, based on the pointer information 815. FIG. 8 also shows returning the search results responsive to the search query being satisfied 820.

In embodiments, a modification counter can be used as described with reference to FIG. 6A.

Figure 9:
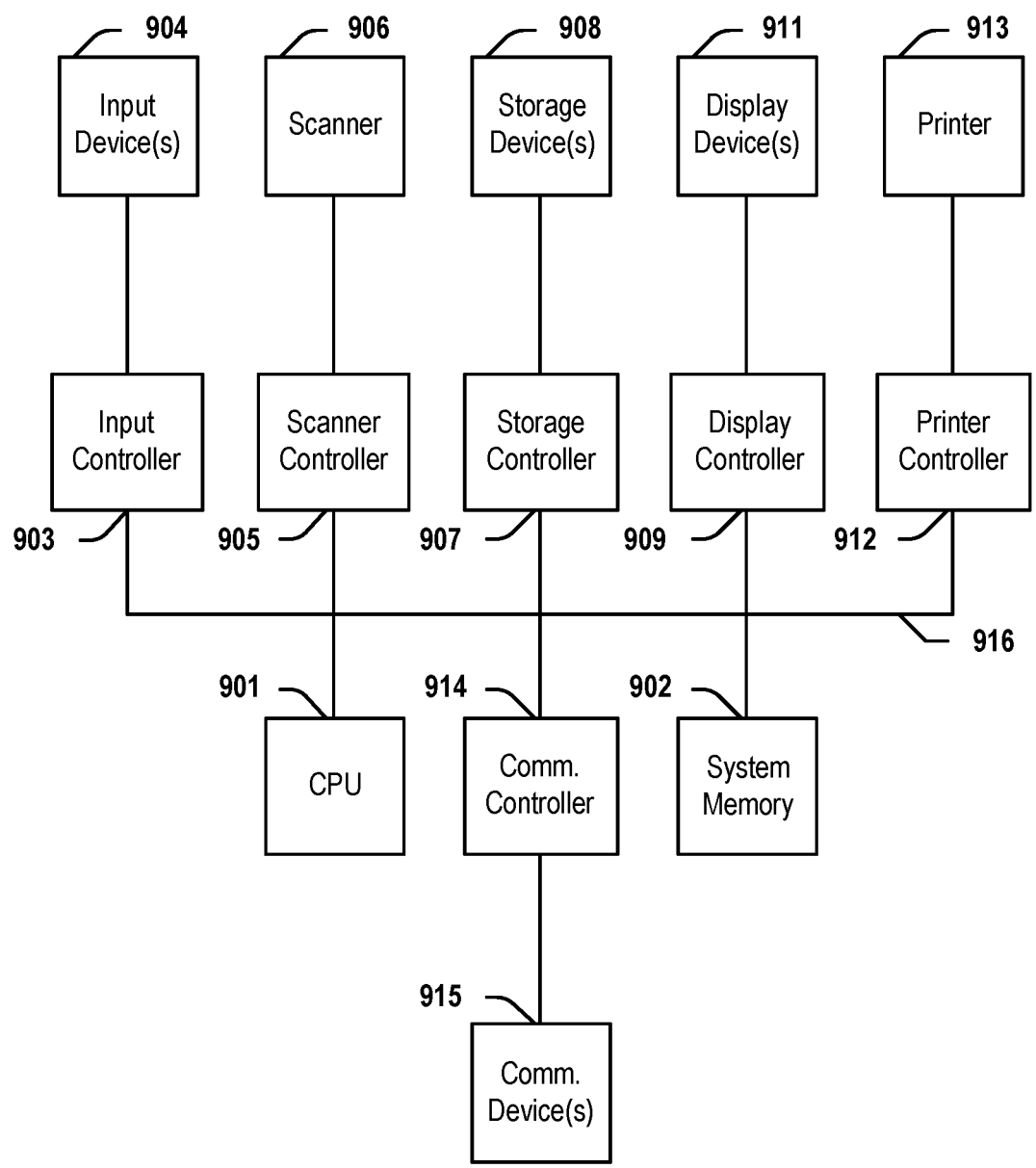
FIG. 9 depicts a block diagram of a computer system according to embodiments of the present invention.

FIG. 9 depicts a block diagram of a computer system 900 according to embodiments of the present invention. It will be understood that the functionalities shown for system 900 may operate to support various embodiments of an information handling system—although it shall be understood that an information handling system may be differently configured and include different components. As illustrated in FIG. 9, system 900 includes a central processing unit (CPU) 901 that provides computing resources and controls the computer. CPU 901 may be implemented with a microprocessor or the like, and may also include a graphics processor and/or a floating-point coprocessor for mathematical computations. System 900 may also include a system memory 902, which may be in the form of random-access memory (RAM) and read-only memory (ROM).

A number of controllers and peripheral devices may also be provided, as shown in FIG. 9. An input controller 903 represents an interface to various input device(s) 904, such as a keyboard, mouse, or stylus. There may also be a scanner controller 905, which communicates with a scanner 906. System 900 may also include a storage controller 907 for interfacing with one or more storage devices 908 each of which includes a storage medium such as magnetic tape or disk, or an optical medium that might be used to record programs of instructions for operating systems, utilities and applications which may include embodiments of programs that implement various aspects of the present invention. Storage device(s) 908 may also be used to store processed data or data to be processed in accordance with the invention. System 900 may also include a display controller 909 for providing an interface to a display device 911, which may be a cathode ray tube (CRT), a thin film transistor (TFT) display, or other type of display. The computing system 900 may also include a printer controller 912 for communicating with a printer 913. A communications controller 914 may interface with one or more communication devices 915, which enables system 900 to connect to remote devices through any of a variety of networks including the Internet, an Ethernet cloud, an FCoE/DCB cloud, a local area network (LAN), a wide area network (WAN), a storage area network (SAN) or through any suitable electromagnetic carrier signals including infrared signals.

In the illustrated system, all major system components may connect to a bus 916, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. An index system for storing an index comprising a plurality of index levels, the plurality of index levels comprising a higher index level and a lower index level, the index system comprising:

an object storage configured to store a plurality of lower-level nodes corresponding to the lower index level, the plurality of lower-level nodes stored as objects in the object storage, at least one of the lower-level nodes comprising a plurality of index entries, the lower-level nodes being leaf nodes or internal nodes of the index system; and a writable database different from the object storage, the writable database configured to:

store a plurality of higher-level nodes, which corresponds to the higher index level, and a plurality of pointers each pointing from one of the plurality of higher-level nodes to one of the lower-level nodes that are stored as the objects in the object storage, at least one of the pointers pointing from the writable database to the object storage, at least one of higher-level nodes including a lookup that defines ranges of index entries that are included in a particular lower-level node pointed by a particular pointer;

receive additional higher-level nodes as the index expands;

merge a set of higher-level nodes together in a new object, at least one of the higher-level nodes in the new object storing an order of a set of multiple lower-level nodes; and migrate the set of higher-level nodes originally stored in the writable database to the object storage by transmitting the new object to the object storage, the new object comprising the set of higher-level nodes pointing to the set of lower-level nodes, wherein a number of index levels migrated to the object storage increases as the index expands.

2. The system of claim 1, wherein the writable database is a distributed database.

3. The system of claim 1 further comprising an encryption tool configured to encrypt one or more of the higher-level nodes.

4. The system of claim 1, wherein a root of the indexes is updated by the writable database as data is added to the object storage.

5. The system of claim 1 further comprising a modification counter implemented to count the number of times a particular object is stored and the count is used as a part of an initialization vector (IV) when encrypting the particular object.

6. The system of claim 1, wherein at least one of the objects in the object storage is a merged index.

7. The index system of claim 1, wherein, responsive to receiving a search term, the index system is configured to locate a range to which the search term belongs and locate a particular object in the object storage based on one of the pointers, thereby speeding up locating the search term indexed in the particular object.

8. The system of claim 1, wherein the objects that store the plurality of lower-level nodes in the object storage are write-once-read-many objects.

9. A method of building an index system for storing an index comprising a plurality of index levels, the plurality of index levels comprising a higher index level and a lower index level, the method comprising:
storing a plurality of lower-level nodes corresponding to the lower index level in an object storage, the plurality of lower-level nodes stored as objects in the object storage, at least one of the lower-level nodes comprising a plurality of index entries, the lower-level nodes being leaf nodes or internal nodes of the index system;
creating a distributed database index in a writable database that is different from the object storage, the distributed database index comprising a plurality of higher-level nodes, which corresponds to the higher index level, and a plurality of pointers each pointing from one of the plurality of higher-level nodes to one of the lower-level nodes that are stored as the objects in the object storage, at least one of the pointers pointing from the writable database to the object storage, at least one of higher-level nodes including a lookup that defines ranges of index entries that are included in a particular lower-level node pointed by a particular pointer;
receiving additional higher-level nodes as the index expands;
merging a set of higher-level nodes together in a new object, at least one of the higher-level nodes in the new object storing an order of a set of multiple lower-level nodes; and
migrating the set of higher-level nodes originally stored in the writable database to the object storage by transmitting the new object to the object storage, the new object comprising the set of higher-level nodes pointing to the set of lower-level nodes, wherein a number of index levels migrated to the object storage increases as the index expands.

10. The method of claim 9 further comprising encrypting one or more of the higher-level nodes.

11. The method of claim 9 further comprising merging a subset of the plurality of indexes into a merged index that is saved as a particular object in the object storage.

12. The method of claim 9, a root of the indexes is updated by the writable database as data is added to the object storage.

13. The method of claim 9, wherein at least one of the objects in the object storage is a merged index.

14. The method of claim 9, further comprising:
locating, responsive to receiving a search term, a range to which the search term belongs; and
locating a particular object in the object storage based on one of the pointers, thereby speeding up locating the search term indexed in the particular object.

15. The method of claim 9, wherein the objects that store the plurality of lower-level nodes in the object storage are write-once-read-many objects.

16. A non-transitory computer readable medium configured to store computer code comprising instructions for building an index system for storing an index comprising a plurality of index levels, the plurality of index levels comprising a higher index level and a lower index level, the instructions, when executed by one or more processors, cause the one or more processors to at least:
store a plurality of lower-level nodes corresponding to the lower index level in an object storage, the plurality of lower-level nodes stored as objects in the object storage, at least one of the lower-level nodes comprising a plurality of index entries, the lower-level nodes being leaf nodes or internal nodes of the index system;
create a distributed database index in a writable database that is different from the object storage, the distributed database index comprising a plurality of higher-level nodes, which corresponds to the higher index level, and a plurality of pointers each pointing from one of the plurality of higher-level nodes to one of the lower-level nodes that are stored as the objects in the object storage, at least one of the pointers pointing from the writable database to the object storage, at least one of higher-level nodes including a lookup that defines ranges of index entries that are included in a particular lower-level node pointed by a particular pointer;
receive additional higher-level nodes as the index expands;
merge a set of higher-level nodes together in a new object, at least one of the higher-level nodes in the new object storing an order of a set of multiple lower-level nodes; and
migrate the set of higher-level nodes originally stored in the writable database to the object storage by transmitting the new object to the object storage, the new object comprising the set of higher-level nodes pointing to the set of lower-level nodes, wherein a number of index levels migrated to the object storage as the index expands.

17. The non-transitory computer readable medium of claim 16, wherein the writable database is a distributed database.

18. The non-transitory computer readable medium of claim 16, wherein the instructions, when executed, further cause the one or more processors to count the number of times a particular object is stored and the count is used as a part of an initialization vector (IV) when encrypting the particular object.

19. The non-transitory computer readable medium of claim 16, wherein at least one of the objects in the object storage is encrypted.

20. The non-transitory computer readable medium of claim 16, wherein at least one of the objects in the object storage is a merged index.

21. The non-transitory computer readable medium of claim 16, wherein the objects that store the plurality of lower-level nodes in the object storage are write-once-read-many objects.

* * * * *